United States Patent [19]

Dam

[11] Patent Number: 5,840,097
[45] Date of Patent: *Nov. 24, 1998

[54] METHOD FOR DIRECT REDUCTION OF OXIDES

[75] Inventor: Oscar G. Dam, Puerto Ordaz, Venezuela

[73] Assignee: Xera Technologies Ltd., Grand Cayman, Cayman Islands

[*] Notice: The term of this patent shall not extend beyond the expiration date of Pat. No. 5,702,246.

[21] Appl. No.: 718,770

[22] Filed: Sep. 24, 1996

Related U.S. Application Data

[63] Continuation-in-part of Ser. No. 603,922, Feb. 22, 1996, Pat. No. 5,702,246.

[51] Int. Cl.$^6$ .................................................. C21B 13/02
[52] U.S. Cl. .............................. 75/505; 75/495; 266/148; 266/156
[58] Field of Search ............................ 75/496, 490, 495, 75/505; 266/148, 156

[56] References Cited

U.S. PATENT DOCUMENTS

| | | | |
|---|---|---|---|
| 2,048,112 | 7/1936 | Gahl | 75/496 |
| 3,375,099 | 3/1968 | Marshall | 75/496 |
| 4,880,458 | 11/1989 | Martinez-Vera et al. | 75/495 |
| 5,702,246 | 12/1997 | Dam | 432/95 |

*Primary Examiner*—Melvyn Andrews
*Attorney, Agent, or Firm*—Bachman & LaPointe, P.C.

[57] ABSTRACT

A method for direct reduction of oxides includes the steps of: providing a reduction zone for direct reduction of oxides and a gas reforming zone communicating with the reduction zone; feeding metal oxides to the reduction zone; feeding a gas mixture comprising methane and an oxygen source to the gas performing zone to provide a reformed gas comprising hydrogen and carbon monoxide; contacting the oxides and the reformed gas in the reduction zone to provide a reduced metal and a top gas; and treating the top gas so as to provide the gas mixture.

26 Claims, 1 Drawing Sheet

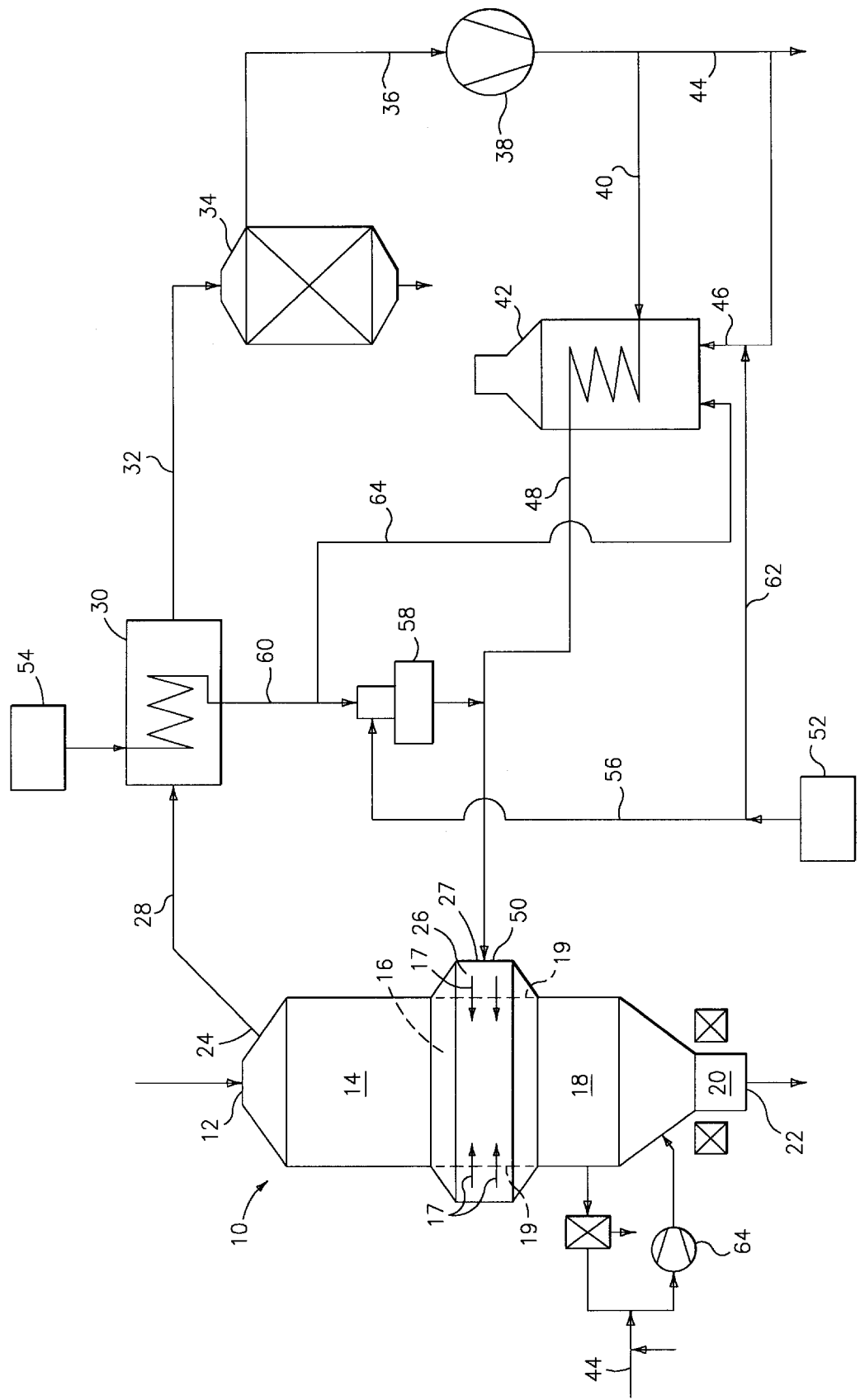

METHOD FOR DIRECT REDUCTION OF OXIDES

CROSS REFERENCE TO RELATED APPLICATION

This application is a continuation-in-part of U.S. patent application Ser. No. 08/603,922 filed Feb. 22, 1996 now U.S. Pat. No. 5,702,246.

BACKGROUND OF THE INVENTION

The invention relates to an improved method for direct reduction of oxides, especially iron oxides in a shaft furnace.

Conventionally, shaft furnaces are used to treat metal oxides such as iron oxides at elevated temperatures with a reduction material such as reducing gas, rich in hydrogen and carbon monoxide, so as to reduce the oxides and thereby produce a metallized product such as reduced iron at a discharge outlet of the shaft furnace.

Typically, the direct reduction process is a multi-step process wherein reducing gas is produced in an external reactor known as a reformer. In a separate step, reducing gas is then fed to the furnace for the desired reaction. Other methods involve gas reformation in the reduction zone.

A need remains for a method for direct reduction of oxides which does not involve a multi-step procedure and which uses energy in an efficient manner.

It is therefore the primary object of the present invention to provide a method for direct reduction of oxides wherein the need for separate gas reformer equipment is avoided.

It is a further object of the present invention to provide a method for direction reduction of oxides wherein the reduction process is carried out in an efficient manner.

Other objects and advantages of the present invention will appear hereinbelow.

SUMMARY OF THE INVENTION

In accordance with the invention, the foregoing objects and advantages are readily attained.

According to the invention, a method is provided for direct reduction of oxide which method comprises the steps of: providing a reduction zone for direct reduction of oxides and a gas reforming zone communicated with said reduction zone; feeding metal oxides to said reduction zone; feeding a gas mixture comprising methane and an oxygen source to said gas reforming zone to provide a reformed gas comprising hydrogen and carbon monoxide; contacting said oxides and said reformed gas in said reduction zone to provide a reduced metal and a top gas; and treating said top gas so as to provide said gas mixture.

In further accordance with the invention, the step of providing said reduction zone and said gas reforming zone preferably comprises the steps of: providing a shaft furnace having an oxide inlet, a pre-heating and pre-reducing zone downstream of said oxide inlet and having a top gas outlet, said reducing zone downstream of said pre-heating and pre-reducing zone, a transition zone downstream of said reduction zone, a discharge zone downstream of said transition zone, and said gas reforming zone associated with said reducing zone for gas flow from said gas reforming zone to said reducing zone.

BRIEF DESCRIPTION OF THE DRAWINGS

A detailed description of the preferred embodiments of the invention follows, with reference to the attached drawing which is a schematic representation of a system for carrying the method of the present invention.

DETAILED DESCRIPTION

The invention relates to a method for direct reduction of oxides, especially direct reduction of iron oxides, wherein iron oxide is treated in a shaft furnace with a reducing gas containing hydrogen and carbon monoxide for reducing the iron oxides and thereby providing a metallized product. According to the invention, reducing gas is fed to a reduction zone for treating the iron oxides and is drawn off from the reduction zone as top gas and recycled and reformed into reducing gas for further treatment. According to the invention, gas is reformed in a gas reforming zone defined substantially adjacent to and communicated with the reduction zone so that gas introduced to the reforming zone at reforming temperature can advantageously flow directly to the reduction zone in a manner which enhances the efficiency of the overall process.

Referring now to the drawing, a system for carrying out the method of the present invention is schematically illustrated. As shown, a shaft furnace 10 is preferably provided having an oxide inlet 12, a pre-heating and pre-reduction zone 14, a reduction zone 16, a transition zone 18 and a discharge zone 20 leading to a metallized product exit 22. During the method of the present invention, oxides such as iron oxide are fed to oxide inlet 12 and travel downstream through zones 14, 16, 18 and 20 to exit 22 where a reduced or metallized product is provided as desired.

According to the invention, a reducing gas is introduced to reduction zone 16 at elevated temperatures so as to provide the desired reduction of iron oxide to metallized product. According to the invention, reducing gas from reduction zone 16 flows upstream into pre-heating and pre-reducing zone 14 where incoming oxides are pre-heated and pre-reduced prior to entry of reduction zone 16. Gases from pre-heating and pre-reducing zone 14 are drawn off as top gas from top gas outlet 24.

In accordance with the invention, and advantageously, top gas from top gas outlet 24 is treated in accordance with the invention so as to provide a gas mixture preferably containing methane and a source of oxygen, and more preferably rich in carbon dioxide, and this gas mixture is introduced to a gas reforming zone 26 of furnace 10 which is preferably defined around or at least partially around reduction zone 16 and communicated with reduction zone 16 through at least one, preferably a plurality of nozzles 17 located in a refractory wall 19 separating zones 26, 16 as shown schematically in the drawing.

In accordance with the invention, the gas mixture containing methane and a source of oxygen is reformed in gas reforming zone 26 so as to provide the desired reducing gas having hydrogen and carbon monoxide content as indicated above. This reducing gas flows from gas reforming zone 26 through nozzles 17 into reduction zone 16 to contact oxides therein and carry out the desired direct reduction of oxides in accordance with the method of the present invention.

Still referring to the drawing, top gas from top gas outlet 24 is preferably treated as follows. Top gas from outlet 24 may be passed through line 28 to a heat exchanger 30 where top gas is partially cooled and an incoming gas, preferably an oxygen source such as air, is partially heated for subsequent mixing with treated top gas as discussed below. From heat exchanger 30, top gas is passed through line 32 to a unit 34 for further cooling and for dewatering the top gas. After cooling and dewatering, top gas preferably has a temperature of between about 40° C. to about 55° C., and a water vapor content of between about 2% to about 3% vol. From unit 34, dewatered top gas is preferably passed through line 36 to a compressor 38.

In accordance with a preferred embodiment of the invention, dewatered top gas from compressor 38 is preferably split, with a first portion being passed through line 40 to heater 42 for heating, while a second portion is passed through line 44 to a fuel inlet 46 for heater 42. In this manner, the second portion of top gas from furnace 10 is used as fuel to reheat the first portion passing through heater 42. Gas heated in heater 42 is passed from line 48 back toward a gas inlet 50 to reformation zone 26 of shaft furnace 10.

Reheated gas from heater 42 may require the addition of methane or other natural gas to have the desired amount of methane, and may also require the addition of oxygen source material such as air so as to provide the desired composition of the gas mixture to be introduced to gas reforming zone 26 of shaft furnace 10. Thus, in accordance with the invention, a source 52 of natural gas or methane is preferably provided, as is a source 54 of oxygen, which may preferably be a source of air, each of which will be described below.

According to the invention, natural gas from source 52 is preferably passed through line 56 to a heater 58 and subsequently to line 48 for mixing with heated top gas from heater 42 to provide a desired methane content. Similarly, air from source 54 may suitably be passed through heat exchanger 30 for partial heating and subsequently, through line 60, to heater 58 for additional heating before mixing with natural gas from line 56 and/or reheated top gas from line 48 so as to provide the gas mixture with desired amounts of oxygen.

Natural gas or methane from source 52 may also be passed through line 62 to serve as additional fuel for heater 42 if needed, while air from source 54, for example after passing through heat exchanger 30, may suitably be passed through line 64 to serve as a source of air for combustion of fuel in heater 42 as desired.

As set forth above, reformed gas after treatment in gas reforming zone 26 preferably includes hydrogen and carbon monoxide for use in direct reduction of oxides in reduction zone 16. Preferably, reformed gas consists essentially of about 40–43% hydrogen, about 28–30% carbon monoxide, about 8–10% carbon dioxide, about 1–2% methane, about 17–20% nitrogen and about 1–2% water vapor, all based upon volume of the reformed gas. Still further according to the invention, the reformed gas may be characterized by oxidation degree ($NO_x$), which is defined as follows:

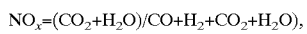

$$NO_x = (CO_2 + H_2O)/(CO + H_2 + CO_2 + H_2O),$$

wherein $CO_2$, $H_2O$, $CO$ and $H_2$ are the % volumes of each component in the reformed gas.

According to the invention, reformed gas preferably has an oxidation degree of between about 0.08 to about 0.12.

Also as set forth above, after treatment of oxides within reduction zone 16 and pre-heating and pre-reduction zone 14, gas is drawn off from furnace 10 through top gas outlet 24. According to the invention, top gas typically consists essentially of about 25–33% hydrogen, about 19–21% carbon monoxide, about 12–15% carbon dioxide, about 8–10% methane, about 10–14% water vapor and about 14–16% nitrogen based upon volume of said top gas. Top gas may typically have an oxidation degree of between about 0.5 to about 0.55.

Also as mentioned above, top gas is preferably treated so as to provide the desired gas mixture which is rich in carbon dioxide for feeding to gas inlet 50 of gas reforming zone 26. The gas mixture preferably has a carbon dioxide content of at least about 15% volume. According to the invention, after such treatment, the gas mixture more preferably consists essentially of about 35–36% hydrogen, about 18–19% carbon monoxide, about 15–16% carbon dioxide, about 8–10% methane, about 0.5–2.0% water vapor, and about 19–20% nitrogen and about 1% oxygen based on volume of said gas mixture. The gas mixture before reforming preferably has an oxidation degree of between about 0.25 to about 0.38.

During treatment, either or both of methane or natural gas and a source of oxygen may be mixed with the top gas. The methane or natural gas may have any typical content of methane. The source of oxygen may suitably be air, preferably consisting essentially of about 28–29% carbon dioxide, about 5–6% water vapor, about 76–77% nitrogen and about 15–17% oxygen, so as to provide the desired gas mixture rich in carbon dioxide as discussed above.

Still further according to the invention, the temperature of gas at various stages is a factor in providing the desired reactions in gas reforming zone 26 and reduction zone 16. In accordance with the invention, the gas mixture fed to gas reforming zone 26 preferably has a temperature of between about 980° C. to about 1100° C., while reformed gas in reduction zone 16 preferably has a temperature of between about 850° to about 950° C., and top gas drawn off from top gas exit 24 typically has a temperature of between about 360° C. to about 400° C.

According to the invention, the gas mixture is preferably introduced to gas inlet 50 so as to provide a gas flow rate within furnace 10 between about 900 to about 1300 $Nm^3$/ton of oxide. Further, as set forth above, gas reforming zone 26 is preferably defined between a portion of the outer wall of furnace 10 preferably in the vicinity of reduction zone 16, and the inner wall of a ring member 27 positioned around furnace 10. Thus, the inner walls of ring member 27 and a portion of the outer wall of furnace 10 serve to define gas reforming zone 26 as a substantially annular chamber defined around the periphery of furnace 10 and having nozzles 17 communicating zone 26 with zone 16. According to the invention, the walls defining gas reforming zone 26 are preferably at least partially coated or otherwise treated with a catalyst material such as nickel to enhance the gas reforming reaction. In addition to nickel catalyst, ceramic material has also been found to be particularly effective for enhancing this reaction. According to the method of the present invention, surface area of the catalyst material in gas reforming zone 26 and gas flow rate are preferably selected so as to provide a surface area of catalyst per flow of methane of at least about 70 $m^2/m^3$ $CH_4$.

In accordance with a further preferred embodiment of the invention, metallized product from reduction zone 16 passing to transition zone 18 is preferably cooled. According to the invention, a third portion of top gas from line 44 may be fed through a compressor 64 and introduced to transition zone 18 for cooling metallized product contained therein. By feeding this third portion of top gas to transition zone 18 after the top gas is cooled and dewatered, but prior to reheating, the top gas advantageously serves as a cooling medium for metallized product contained in transition zone 18, without exposing the metallized product to significant sources of oxygen, thereby advantageously avoiding any re-oxidation of the metallized product.

Also, at least some of this portion of gas flows upwardly or upstream in furnace 10 to zone 16, zone 14 and eventually to outlet 24. This additional gas helps to raise the level of methane in the top gas to the desired amount of about 8–10% by volume.

In accordance with the invention, the temperature within reduction zone 16 is preferably maintained within ranges which provide for reduction of metal oxides as desired. Furthermore, the temperature within gas reforming zone 26 is preferably maintained within a range of temperatures allowing for the desired gas reformation reactions.

It should be noted that the method of the present invention can be carried out using any of a wide variety of reactors such as, for example, shaft furnace moving bed type reactors, fluidized bed reactors having idle gas distributing chambers and the like, all within the scope of the present invention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for direct reduction of oxides; comprising the steps of:
   providing a furnace having a reduction zone and a reforming zone defined substantially adjacent to said reduction zone and communicating with said reduction zone through at least one nozzle for infecting a reformed gas into said reduction zone wherein said reduction zone and said reforming zone are separated by a refractory wall;
   feeding metal oxides to said reduction zone;
   feeding a gas mixture comprising methane and an oxygen source to said gas reforming zone to provide a reformed gas comprising hydrogen and carbon monoxide;
   contacting said oxides and said reformed gas in said reduction zone to provide reduced metal oxides and a top gas; and
   treating said top gas so as to provide said gas mixture.

2. A method according to claim 1, wherein said top gas further comprises about 25–33% hydrogen, about 19–21% carbon monoxide, about 12–15% carbon dioxide, about 8–10% methane, about 10–14% water vapor and about 14–16% nitrogen based upon volume of said top gas.

3. A method according to claim 1, wherein said gas mixture further comprises about 35–36% hydrogen, about 18–19% carbon monoxide, about 15–16% carbon dioxide, about 8–10% methane, about 0.5–2.0% water vapor, and about 19–20% nitrogen and about 1% oxygen based on volume of said gas mixture.

4. A method according to claim 1, wherein said step of feeding said gas mixture comprises feeding said gas mixture at a gas reforming temperature, and wherein said top gas has a top gas temperature lower than said gas reforming temperature, and wherein said treating step includes the step of reheating said top gas to said reforming temperature.

5. A method according to claim 4, wherein said gas reforming temperature is between about 980° C. to about 1100° C., and said top gas temperature is between about 360° C. to about 400° C.

6. A method according to claim 4, wherein said reheating step is carried out in a heating means, and further comprising the steps of splitting said top gas into a first portion and a second portion, feeding said first portion to said heating means to be heated, and feeding said second portion to said heating means as fuel for said heating means.

7. A method according to claim 6, further comprising the step of dewatering said top gas at least prior to feeding said second portion to said heating means.

8. A method according to claim 1, wherein said treating step comprises dewatering said top gas and adding a methane containing gas and an oxygen containing gas to said top gas to form said gas mixture.

9. A method according to claim 8, wherein said gas mixture has an oxidation degree of between about 0.25 to about 0.38.

10. A method according to claim 8, wherein said gas mixture contains at least about 15% volume carbon dioxide.

11. A method according to claim 8, wherein said gas mixture contains between about 15 to about 16% volume carbon dioxide.

12. A method according to claim 1, wherein said reformed gas has an oxidation degree of between about 0.08 to about 0.12.

13. A method according to claim 1, wherein said step of feeding said gas mixture comprises feeding said gas mixture at a flow rate of between about 900 to about 1300 $Nm^3$/ton oxide.

14. A method according to claim 1, wherein said step of providing said reduction zone and said gas reforming zone comprises providing a shaft furnace having an oxide inlet, a pre-heating and pre-reducing zone downstream of said oxide inlet and having a top gas outlet, said reducing zone downstream of said pre-heating and pre-reducing zone, a transition zone downstream of said reduction zone, a discharge zone downstream of said transition zone, and said gas reforming zone associated with said reducing zone for gas flow from said gas reforming zone to said reducing zone.

15. A method according to claim 14, wherein said step of feeding said oxides comprises feeding said oxides to said oxide inlet for flow downstream through said shaft furnace, and wherein said step of feeding said gas mixture comprises feeding said gas mixture to said gas reforming zone whereby said gas mixture is reformed to provide said reducing gas, and said reducing gas flows upstream through said reducing zone and said pre-heating and pre-reducing zone to said top gas outlet.

16. A method according to claim 14, further comprising the step of feeding a portion of said top gas to said transition zone so as to cool reduced metal in said transition zone.

17. A method according to claim 16, further comprising the step of cooling and dewatering said portion of said top gas before feeding to said transition zone.

18. A method according to claim 1, wherein said step of providing said gas reforming zone comprises providing said gas reforming zone including a catalyst for a gas reformation reaction.

19. A method according to claim 18, wherein said gas reforming zone has a catalyst surface area of at least about 70 $m^2$ catalyst/$m^3$ of methane.

20. A method according to claim 1, wherein said reformed gas further comprises about 40–43% hydrogen, about 28–30% carbon monoxide, about 8–10% carbon dioxide, about 1–2% methane, about 17–20% nitrogen and about 1–2% water vapor based on volume of said gas.

21. A method for direct reduction of oxides, comprising the steps of:
   providing a reduction zone for direct reduction of oxides and a gas reforming zone communicated with said reduction zone;
   feeding metal oxides to said reduction zone;
   feeding a gas mixture comprising methane and an oxygen source to said gas reforming zone to provide a reformed gas comprising hydrogen and carbon monoxide;
   contacting said oxides and said reformed gas in said reduction zone to provide a reduced metal and a top gas; and treating said top gas so as to provide said gas mixture wherein said step of feeding said gas mixture comprises feeding said gas mixture at a gas reforming temperature, and wherein said top gas has a top gas temperature lower than said gas reforming temperature, and wherein said treating step includes the step of reheating said top gas to said reformining temperature.

22. A method according to claim 21, wherein said gas reforming temperature is between about 980° C. to about 1100° C., and said top gas temperature is between about 360° C. to about 400° C.

23. A method accordingto claim 21, wherein said reheating step is carried out in a heating means, and further comprising the steps of splitting said top gas into a first portion and a second portion, feeding said first portion to said heating means to be heated, and feeding said second portion to said heating means as fuel for said heating means.

24. A method according to claim 23, further comprising the step of dewatering said top gas at least prior to feeding said second portion to said heating means.

25. A method according to claim 1, wherein said providing step comprises providing a furnace having said reduction zone and having said reforming zone defined substantially adjacent to said reduction zone and communicated with said reduction zone through at least one nozzle for injecting said reformed gas into said reduction zone.

26. A method according to claim 25, wherein said reduction zone and said reforming zone are separated by a refractory wall.

* * * * *

UNITED STATES PATENT AND TRADEMARK OFFICE
CERTIFICATE OF CORRECTION

PATENT NO. : 5,840,097
DATED : November 24, 1998
INVENTOR(S) : Oscar G. Dam

It is certified that error appears in the above-identified patent and that said Letters Patent is hereby corrected as shown below:

Claim 1, line 1, after "oxides" delete the ";" and insert --,--.

Claim 1, line 6, delete "infecting" and insert --injecting--.

Claim 25, change the dependency from "1" to --21--.

Signed and Sealed this

Twenty-third Day of March, 1999

Attest:

Q. TODD DICKINSON

*Attesting Officer*  *Acting Commissioner of Patents and Trademarks*